Figure 1:
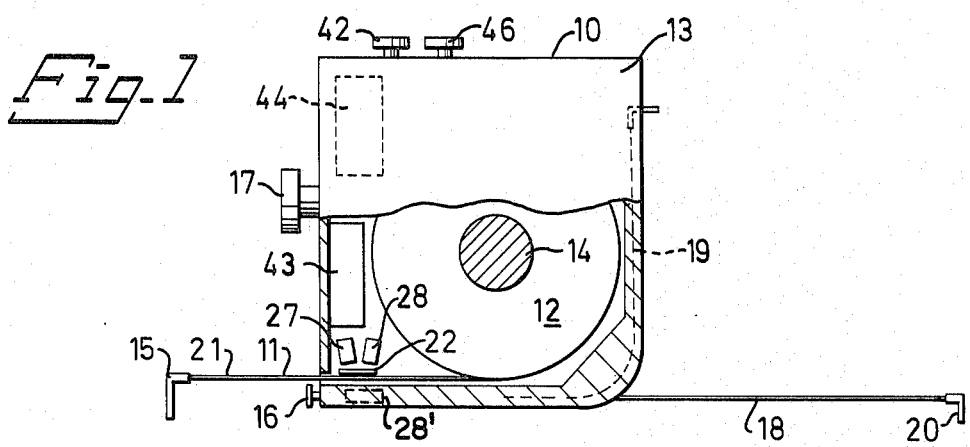

United States Patent [19]

Bergkvist

[11] 4,164,816
[45] Aug. 21, 1979

[54] ELECTRONIC MEASURING TAPE

[76] Inventor: Lars A. Bergkvist, Gottne, 890 42 Mellansel, Sweden

[21] Appl. No.: 840,849

[22] Filed: Oct. 11, 1977

[30] Foreign Application Priority Data

Oct. 15, 1976 [SE] Sweden ............................ 7611512

[51] Int. Cl.² ............................................. G01B 3/10
[52] U.S. Cl. ................................. 33/139; 250/237 G
[58] Field of Search ........................ 33/138, 139, 140; 356/169, 151; 250/237 G; 235/92 DN

[56] References Cited

U.S. PATENT DOCUMENTS

| 2,886,717 | 5/1959 | Williamson et al. | 33/125 C |
| 2,948,890 | 8/1960 | Barth et al. | 33/1 L |
| 3,658,429 | 4/1972 | Zipin | 33/125 C |
| 3,674,372 | 7/1972 | Weyrauch | 356/169 |
| 3,816,002 | 6/1974 | Wieg | 33/125 C X |
| 4,031,360 | 6/1977 | Soule | 33/139 X |

FOREIGN PATENT DOCUMENTS

| 719410 | 10/1965 | Canada | 33/125 C |
| 971504 | 9/1964 | United Kingdom | 356/169 |

Primary Examiner—Harry N. Haroian
Attorney, Agent, or Firm—Silverman, Cass & Singer, Ltd.

[57] ABSTRACT

A device for electronically indicating the measured distance between two points. A flexible tape retained in coiled fashion in a housing is extended therefrom between the two points to be measured. A Moire interference pattern is produced by movement of the tape having a first screen located thereon; the first screen moves below a second screen mounted in the housing. The Moire interference pattern is opto-electrically read and the length measured is digitally displayed.

9 Claims, 5 Drawing Figures

ELECTRONIC MEASURING TAPE

This invention relates to an electronic measuring tape, which is automatically read optically and where the measured length is shown in a digital manner on a display.

Known types of flexible measuring tapes are intended for manual visual reading.

Known devices for automatic indication of measurements often are very complicated and cannot be taken along like a usual measuring tape, but are intended primarily for industrial use.

The present invention relates to a measuring tape, which is intended to be used as a normal measuring tape, for example as the known tape meter, and be taken along by a person, for example a private person for home-use or a craftsman at work.

The present invention relates to an electronic measuring tape for automatic reading a measured length, which tape in non-operative position is stored on a spool in a housing, and for measuring can be pulled out of said housing, comprising a first and a second portion of a transmitter unit, which portions comprise screens consisting of opaque lines separated by light or transparent lines.

The invention is characterized in that the screen of the first portion is located on the measuring tape, and the screen of the second portion is located in said housing immediately closely to the screen of the first portion, whereby an interference pattern, a so-called moiré pattern, arises upon movement of the screen of the first portion relative to the screen of the second portion when viewing the screen of the first portion through the screen of the second portion, and that a reading means is provided to optically read said interference pattern.

Figure 2:
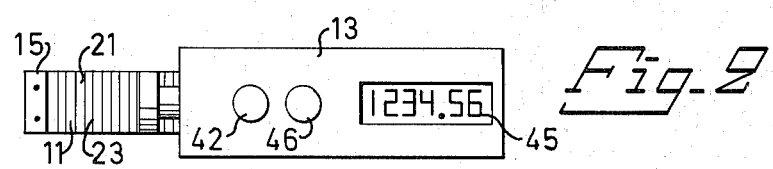
Figure 3:
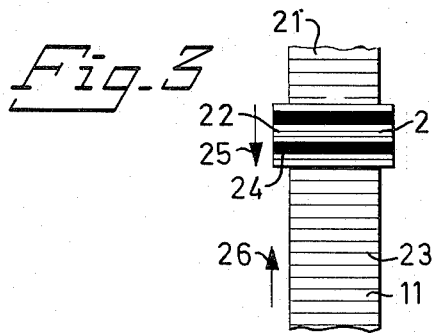
Figure 4:
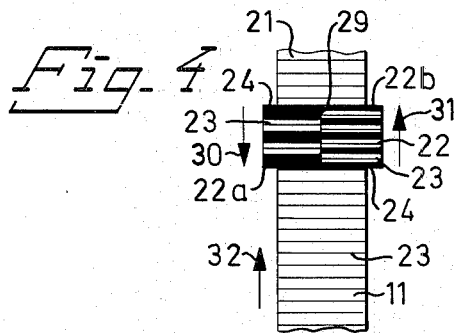
Figure 5:
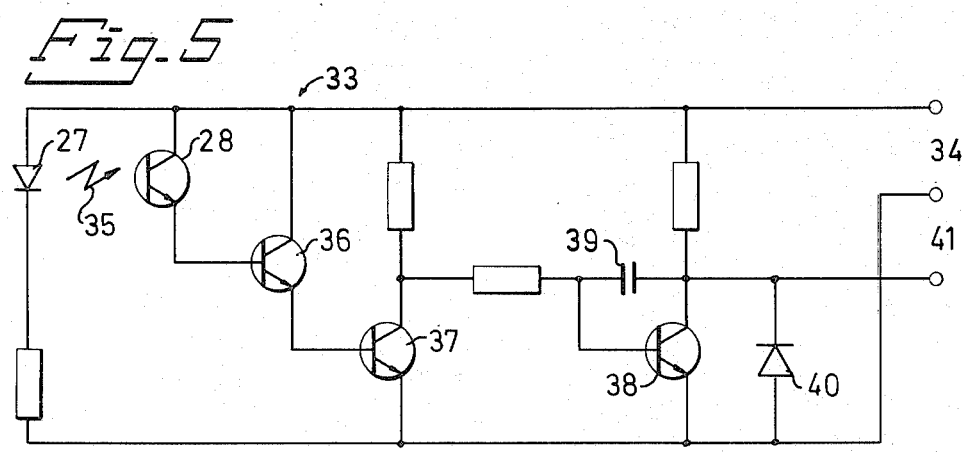

The invention is described in the following, with reference to the accompanying drawing, in which FIG. 1 is a lateral view of a tape meter, to which the present invention is applied, FIG. 2 is a view from above of the tape meter, FIG. 3 shows a first embodiment of the screen of the first and second portion, FIG. 4 shows a second embodiment of the screen of the first and second portion, FIG. 5 is an electric wiring diagram for converting light pulses to voltage pulses.

In FIG. 1 a measuring tape in the form of a tape meter 10 is shown, which comprises a tape 11 supported in wound-up state in a spool 12 in a housing 13 about an axle 14. For measuring a length, the tape 11 is pulled out of the housing. The terminating points of the measuring distance preferably consist of a hook 15 attached to the forward edge of the tape 11 and a reference hook 16 stationary on the housing 13, or some other suitable reference hook. Upon pulling the tape 11 out of the housing 13, energy is stored in a spring means (not shown), which in known manner causes the tape be reeled into the housing after completed measuring by action of said spring. Furthermore, in known manner a pawl is provided, by which the tape 11 can be stopped in partially or fully pulled-out position. In FIG. 1 the pawl is illustrated by a control button 17, which is pushed in to release the pawl and pulled out to actuate the pawl.

For certain kinds of measuring a tongue 18 can be folded out in known manner to a position in parallel with the tape 11 on the opposite side of the housing 13, as shown in FIG. 1. When the tongue is folded in, it is fitted into a groove (not shown) in the housing 13 to a position indicated by the dashed line 19 in FIG. 1.

The measuring tongue 18 being in folded-out state, measuring takes place between the hook 15 on the tape 11 and the hook 20 at the outer end of the measuring tongue 18.

The tape 11 and measuring tongue 18 preferably are made of a steel material as used for usual tape meters.

The housing 13 preferably is made of a steel material or strong plastic material.

As mentioned above and shown in FIGS. 1, 2 and 3, the device according to the invention comprises a first portion 21 and a second portion 22 of a transmitter unit, which portions 21, 22 comprise screens. The screen 21 of the first portion is located on the upper surface of the tape 11 in FIG. 1, and the screen 22 of the second portion is stationary located in the housing 13. The screens of the first and second portion consist of opaque lines 23 separated by light or transparent lines. For the sake of clarity, only a few opaque lines 23 are shown in the Figures.

When two screen consist of opaque lines separated by transparent interspaces, an interference pattern, a so-called moiré pattern, arises when viewing a first screen through a second screen. Depending on the design of the two screens relative to each other, different types of moiré pattern can be caused to arise.

According to the present invention, the opaque lines 23 associated with the screen 21 of the first portion are located substantially perpendicularly to the longitudinal direction of the tape 11, and the opaque lines 23 associated with the screen 22 of the second portion are located substantially in parallel with the opaque lines 23 of the first portion 21.

When the tape 11 is being pulled out of the housing 13 for measuring a distance, and thereby the first screen 21 is moved perpendicularly to the opaque lines 23 on the second screen 22, an interference pattern of migrating wide dark bands 24 arises, for example as shown in FIG. 2, when viewing the first screen 21 through the second screen 22. According to the present invention, the screens 21, 22 are designed so that the screen 21 of the first portion has a division, i.e. a number of opaque lines 23 per length unit perpendicular to the lines 23, which differs from the division of the screen 22 of the second portion.

This difference in division preferably is obtained thereby, that the opaque lines 23 on the two portions 21, 22 have the same width, and that the width of the light or transparent lines in the screen 21 of the first portion is different from the width in the screen 22 of the second portion.

According to a modified embodiment, however, the width of the opaque lines 23 as well as the width of the light or transparent lines in the screen 21 of the first portion are different from the width in the screen 22 of the second portion. By designing the screens 21, 22 as indicated above, an interference patterns is obtained which, as stated, consists of wide dark bands 24 when the screen 21 of the tape moves relative to the screen 22 of the second portion.

The migration direction of the wide bands 24 depends on which of the two screens 21, 22 has the densest division.

FIG. 3 shows by way of example an embodiment where the screen 22 of the second portion has a denser division, i.e. a greater number of opaque lines 23 per length unit perpendicular to the lines 23, than the screen 21 of the first portion. As a result thereof, the wide bands 24 migrate in a direction marked by the arrow 25 when the tape 11 is pulled in a direction marked by the arrow 26.

When the screen 21, 22 of the first and second portion have a different division, the wide bands 24 will migrate through a distance, which is longer than the distance, through which the tape 11 has moved. Thereby a ratio is obtained between the distance, through which the tape 11 moves, and the distance, through which the wide bands 24 move. Consequently, the movement of the tape 11 can be read with higher accuracy by means of the migration of the wide bands 24 than by a reading directly against the tape 11.

The ratio thus obtained depends on the difference in division between the screen 21, 22 of the first and second portion. In order to obtain a high ratio, i.e. a great number of wide bands 24 passing a point on the second screen 22 for a certain movement of the tape 11, the difference in division between the screens 21, 22 of the two portions must be small. When, for example, the opaque lines 23 on the two screens 21, 22 have the same width, the example 0.6 mm, and the light or transparent lines therebetween have a width on one screen of 0.5 mm and on the second screen of 0.3 mm, a ratio of the magnitude of about 10 times is obtained, i.e. the wide bands 24 seem to migrate over the screen 21, 22 a distance 10 times longer than the distance through which the tape 11 was moved. In this example, thus, is shown that a substantially higher accuracy with respect to the measuring of the movement of the tape 11 can be obtained by the device according to the invention, compared with direct measuring on the tape 11 as, for example, in the case of a tape meter.

According to a preferred embodiment of the invention, the screen 21 of the first portion consists of opaque lines 23 separated by light, preferably white lines, and the screen 22 of the second portion consists of opaque lines 23 separated by transparent lines. The second portion preferably is made of a transparent plastic material, on which said screen 22 has been applied.

A reading means provided in the housing 10 comprises one or more light diodes 27 or the like for lighting the screens 21, 22 of the transmitter unit and one or more phototransistors 28 or the like for recording the interference pattern or patterns.

According to the preferred embodiment, the light diode 27, or light diodes, and the phototransistor 28, or phototransistors are located on that side of the screen 22 of the second portion which faces away from the screen 21 of the first portion.

When the screen 21, 22 of the first and second portion, respectively, consists of one screen, one light diode 27 and one phototransistor 28 are used.

At measuring and recording the interference pattern, the light diode 27 lights through the screen 22 of the second portion, whereby the light is reflected against the screen 21 of the first portion and further is transmitted through the screen 22 of the second portion to meet the phototransistor 28.

When the tape 11 is being pulled out of the housing 13, thus, a plurality of migrating dark bands 24 will cause the light from the light diode 27 to meet the phototransistor 28 in the form of pulsating light. The phototransistor converts these light pulses to electric pulses, which are amplified and processed in an electronic unit suitable for this purpose.

By arranging the screens 21, 22 of the two portions so that a high ratio of the aforesaid kind is obtained, a great number of electric pulses can be obtained from the phototransistor for a relative small movement of the tape 11.

It also appears from the aforesaid, that a high accuracy with respect to a distance, through which the tape 11 is moved, is obtained with the device according to the present invention, without its components having to be designed with a corresponding high precision.

In order to obtain a very high accuracy, according to a further embodiment the screen of the first or second portion is divided into two screens. The screen 22, for example, of the second portion consists of two screens 22a, 22b with different division, where the partition line 29 between the screens 22a, 22b is perpendicular to the opaque lines 23 and located symmetrically on the second portion, as shown in FIG. 4.

One of the two screens 22a, 22b has a division, which is denser than the division of the screen 21 of the first portion, and the second one of the two screens 22a, 22b has a division, which is more sparse than the division of the screen 21 of the first portion. When, for example, one screen 22a in FIG. 3 has a denser division, and the second screen 22b has a more sparse division than the screen 21 of the first portion, the wide bands 24 on the screen 22a migrate as indicated by the arrow 30, and on the second screen 22b as indicated by the arrow 31, when the tape 11 is moved as indicated by the arrow 32. The division of the two screens 22a, 22b on the second portion can be of different relations to the division of the screen 21 of the first portion, in which case the wide bands 24 will migrate at a greater speed over one of the two screens 22a, 22b than over the second one of the screens 22a, 22b.

At this embodiment a light diode 27 is provided for each of the two screens 22a, 22b, and in a corresponding way a phototransistor is provided for each of the screens 22a, 22b.

The resulting two interference patterns render it possible to record also the direction of movement of the tape 11. It also is obvious, that a higher accuracy than at the firstmentioned embodiment can be achieved, because a phase comparision can be made between the interference patterns.

It was stated above, that the screen 21 of the first portion preferably consists of opaque lines separated by light, preferably white lines. The tape 11, however, can also be made of a transparent material, in which case the screen 21 applied to the tape 11 consists of opaque lines separated by transparent lines. In this case, the light diode 27 and a phototransistor 28' are placed on opposite sides of the screens 21 and 22, in such a manner, that the light of the light diode 27 is transmitted through the screens 21 and 22 and thereafter meets the phototransistor 28'. This last mentioned embodiment applies both when the screen 22 of the second portions consists of one screen 22 and when it consists of two screens 22a, 22b. When it consists of two screens 22a, 22b, two light diodes 27 and two phototransistors 28' are used, as mentioned above.

FIG. 5 shows an example of an electric wiring diagram for generating electric pulses corresponding to the aforesaid light pulses. The light diode 27 and the amplifier 33 are supplied with a voltage applied over poles of the input 34. The emitted light 37 of the light diode 27 passes in the manner stated above through the first and second screens 21, 22 of the transmitter unit and meets the phototransistor 28. The resulting signal is amplied in three amplifyer steps, each containing a transistor 36, 37, 38. The capacitor 39 is a feed-back capacitor.

The signal thus obtained in amplitude limited by a Zener diode 40 connected in parallel over the output. The output signal consisting of pulses is taken out via poles of the output 41.

When measuring is to be carried out, a switch 42 is moved to a position permitting the electronics associated with the measuring tape to receive voltage from a battery 43. Thereafter the tape 11 is pulled out the necessary length, so that the hook 15 on the tape 11 and the reference hook 16 on the housing 13 corresponds to the length to be measured. While the tape 11 is being pulled out, the phototransistors 28 are met by a number of light pulses, which are converted to electric pulses counted by a calculating unit 44. The calculating unit, which can be of known type, is only schematically shown in FIG. 1. Said calculating unit 44 thereafter converts in known manner the number of pulses to digital form and controls a display 45, on which the distance between said two hooks 15, 16 is shown in figures. In FIG. 2 by way of example the distance is shown to be 1243.56 mm. The calculating unit 44 at the preferred embodiment of the invention is designed in known manner so that it receives two different pulsating electric voltages from the two phototransistors 28 and performs the aforesaid phase comparison. The calculating unit 44 preferably is designed to operate continuously, so that figures are shown all the time on said display 45 indicating the current distance between said hooks 15, 16.

After completed measurement, the tape 11 is reeled into the housing 13, and the switch 42 is moved to its breaking position.

For certain types of measuring it is practical to fold out the measuring tongue 18 for measuring between the hook 15 of the tape 11 and the hook 20 of the tongue, as mentioned above. The measuring tongue 15 preferably has a length of 50-100 mm when the tape meter 13 is intended for use at measuring distances up to about 2000 mm. The distance between the hook 20 of the measuring tongue 18 and the reference hook 16, for example, can be 100 mm. At measuring by means of the measuring tongue 18, the button 46 is pressed in, and the calculating unit 44 in known manner is designed to add 100 mm to the measure in question between the hook 15 and the reference hook 16 on said display 45.

The button 46 can be replaced by another switch, which automatically is actuated when the measuring tongue 18 is being folded out.

I claim:

1. An electronic measuring device for indicating the measured length between two fixed points, said device comprising, a housing, a flexible measuring tape retained in the housing coiled upon a spool and adapted for movement of a free end of the tape from a first position in the housing to a second position with the free end and a portion of the tape extended from the housing, the tape being extended between said two points when in said second position with the free end positioned adjacent one of said fixed points and the housing positioned adjacent the other of said fixed points, a first screen provided on the tape for movement therewith and a second stationary screen mounted in the housing overlying the first screen, said screens carrying a series of indicia lines to produce a moire interference pattern as the first screen is moved on the tape with respect to the second screen, means for reading the moire interference pattern including illumination means positioned adjacent the second screen for illuminating the moire pattern as it is produced by movement of the tape between said two points and a phototransistor positioned adjacent the second screen for detecting the moire pattern produced and generating an electrical signal in response thereto, calculator and display means positioned in the housing to receive the signal from the phototransistor and display the measured length defined by the tape as the free end thereof is moved between said two points, and a measuring tongue attached at one end to the housing and adapted for movement of a free end of the tongue from a first position adjacent the exterior of the housing to a second position with the free end extended from the housing, the tongue being extended for measuring a length between third and fourth fixed points when in the second position with the free end positioned adjacent the third fixed point and the housing positioned adjacent the fourth fixed point, means for indicating that the measuring tongue is in the second position, and said calculation and display means being coupled to the indication means and adapted to add the length measured by the measuring tongue to the length measured by the measuring tape.

2. An electronic measuring device according to claim 1 wherein said first and second screens include a plurality of indicia lines per unit of length, and the number of indicia lines per unit of length of said first screen is different than the number of indicia lines per unit of length of said second screen.

3. An electronic measuring device according to claim 1 wherein said indicia lines of said first and said second screens are arranged generally normal with respect to the elongate dimension of said tape.

4. An electronic measuring device according to claim 1 wherein said first screen includes a first part having a plurality of indicia lines per unit of length, a second part having a plurality of indicia lines per unit of length, and a partition line which separates said first part from said second part, said partition line being arranged substantially normal with respect to said indicia lines, the number of indicia lines per unit of length of said first part being different than the number of indicia lines per unit of length of said second screen.

5. An electronic measuring device according to claim 1 wherein said second screen includes a first part having a plurality of indicia lines per unit of length, a second part having a plurality of indicia lines per unit of length, and a partition line which separates said first part from said second part and said partition line being arranged substantially normal with respect to said indicia lines, the number of indicia lines per unit of length of said first part being different than the number of indicia lines per unit of length of said second part.

6. An electronic measuring device according to claim 1 wherein said indicia lines include opaque lines separated by transparent lines, and said opaque lines of said first screen and said opaque lines of said second screen are of the same width, and said transparent lines of said first screen and said transparent lines of said second screen are different in width.

7. An electronic measuring device according to claim 1 wherein said indicia lines include opaque lines separated by transparent lines, and said opaque lines of said first screen and said opaque lines of said second screen are different in width, and said transparent lines of said first screen and said transparent lines of said second screen and different in width.

8. An electronic measuring device according to claim 1 wherein the indicia lines on said first screen include opaque lines separated by light colored lines and the indicia lines of said second screen include opaque lines separated by transparent lines.

9. An electronic measuring device according to claim 8 wherein said means for reading the moire interference pattern are positioned on a side of said second screen opposite said first screen.

* * * * *